United States Patent [19]
Yamaguchi et al.

[11] Patent Number: 5,643,119
[45] Date of Patent: Jul. 1, 1997

[54] HYBRID VEHICLE POWERTRAIN

[75] Inventors: Kozo Yamaguchi; Yoshinori Miyaishi, both of Aichi-ken, Japan

[73] Assignee: Kabushikikaisha Equos Research, Japan

[21] Appl. No.: 574,914

[22] Filed: Dec. 19, 1995

[30] Foreign Application Priority Data

Dec. 28, 1994 [JP] Japan ................... 6-328676

[51] Int. Cl.$^6$ ............................... B60K 6/04
[52] U.S. Cl. .................. 475/5; 74/661; 180/65.2
[58] Field of Search .............. 74/661; 475/1, 475/5; 180/65.2, 65.3, 65.4, 53.5; 123/DIG. 8; 290/4 R

[56] References Cited

U.S. PATENT DOCUMENTS

| | | | |
|---|---|---|---|
| 1,992,210 | 2/1935 | Higley | 180/65.2 X |
| 3,161,083 | 12/1964 | Roe | 74/661 |
| 3,478,619 | 11/1969 | Shibata | 74/661 |
| 3,566,717 | 3/1971 | Berman et al. | 180/65.2 |
| 3,861,484 | 1/1975 | Joslin | 475/5 X |
| 5,492,189 | 2/1996 | Kriegler et al. | 180/65.2 |
| 5,562,566 | 10/1996 | Yang | 475/5 X |

FOREIGN PATENT DOCUMENTS

| | | |
|---|---|---|
| 48-49115 | 7/1973 | Japan . |
| 50-85019 | 7/1975 | Japan . |
| 58-45921 | 3/1983 | Japan . |
| 2-7702 | 1/1990 | Japan . |
| 624179 | 5/1949 | United Kingdom ........... 180/65.2 |

OTHER PUBLICATIONS

Japanese Utility-Model Laid-Open No. Hei 2-7702, Jan. 18, 1990.

*Primary Examiner*—Khoi Q. Ta
*Attorney, Agent, or Firm*—Lorusso & Loud

[57] ABSTRACT

A hybrid vehicle is powered by a drive system including an internal combustion engine, a generator and an electric motor. A differential gear unit includes at least three elements, the first connecting to the generator, the second connecting to a first gear and the third connecting the internal combustion engine. A second gear is connected to the output shaft of the electric motor. A counter shaft carries a third gear meshing with the first and second gears and connects to the differential gear unit. The internal combustion engine, differential gear unit and generator are aligned on a first axis, the electric motor is aligned on a second axis parallel to the first axis, the counter shaft is aligned on a third axis parallel to the first and second axes, the differential gear unit is aligned on a fourth axis parallel to the first, second and third axes, and the third axis is disposed inside of a triangle defined by the first, second and fourth axes when viewed on end.

14 Claims, 5 Drawing Sheets

HYBRID VEHICLE POWERTRAIN

BACKGROUND OF THE INVENTION

1. Field of the Invention

This invention relates to a hybrid vehicle of the type driven by a combination of an internal combustion engine (hereinafter referred to as "engine") and an electric motor (hereinafter referred to as "motor").

2. Description of the Related Art

Conventional hybrid vehicles can be generally classified into two groups, the first being a series-type hybrid vehicle in which an engine drives an electric generator and a motor is driven by the electricity to drive the wheels and the second being a parallel-type hybrid vehicle in which the wheels are directly driven by an engine and/or a motor. The hybrid vehicle of the series type is characterized in that the engine is installed separate from the drive train to allow the engine to be run at peak efficiency.

The parallel-type hybrid vehicle can attain an effective energy transmission with a minimum of energy conversion from mechanical to electrical, since the main portion of the drive torque is generated by an engine and an auxiliary torque is obtained from a motor. However, it has been known in the art that engine speed in the parallel-type hybrid vehicle naturally deviates from the most efficient speed because it corresponds to the vehicle speed.

Japanese Utility-model Application No. Hei 2-7702 proposes a modified hybrid vehicle wherein the engine and generator are optionally disconnected from an output shaft by means of a clutch. When the clutch is engaged the vehicle operates as a parallel-type hybrid vehicle, and when the clutch is released the vehicle operates as a series-type hybrid vehicle. It is therefore possible to release the clutch when the vehicle travels on city streets and to engage the clutch when the vehicle moves at high speed.

However, in such conventional hybrid vehicles, the engine and the motor are arranged on one single axis, so that the whole drive system tends to require a long space along that axis. In a FF-type hybrid vehicle, such a long drive train reduces space for the steering angle and thereby increases the minimum turning radius. Furthermore, because rotary power from both the engine and the motor is output to a common output shaft, the gear ratio for the engine should be the same as that for the motor. Therefore, optimum gear ratios for the engine and the motor cannot be independently determined in designing.

SUMMARY OF THE INVENTION

Accordingly, it is an object of the present invention to provide a hybrid vehicle which allows for independent selection of the optimum gear ratio for the engine and for the motor, within a minimum axial length for the drive train, to thereby overcome the problems presented by the above-mentioned conventional hybrid vehicle.

A hybrid vehicle according to the present invention has an internal combustion engine, a generator for generating electricity, an electric motor driven by the generated electricity and a differential gear unit having at least three elements, the first connecting to the generator, the second connecting to a first gear and the third connecting to the internal combustion engine. A second gear is connected to an output shaft extending from the electric motor. A counter shaft carries a third gear which is meshed with both the first and second gears and the differential gear unit is connected to the counter shaft. The internal combustion engine, differential gear system and generator are aligned on a first axis, the electric motor is aligned on a second axis parallel to the first axis, the counter shaft is aligned on a third axis parallel to the first and second axes, and the differential gear system is aligned on a fourth axis parallel to the first, second and third axes. The third axis is disposed inside of a triangle formed first, second and fourth axes as viewed on end.

The counter shaft carries a fourth gear which meshes with a fifth gear in the differential gear unit to drive the differential gear unit.

In one embodiment the first, second and third elements of the differential gear unit are, respectively, a sun gear, a ring gear and a carrier.

In another embodiment, the first, second and third elements of the differential gear system are, respectively, a sun gear, a carrier and a ring gear.

The generator is preferably a magneto-generator or an excitation generator.

The first axis further aligns with a resolver located on the opposite side of the internal combustion engine.

The first and third gears provide a gear ratio different from the gear ratio provided the second and third gears.

The output shaft of the internal combustion engine is rotatably supported at one end by a case, which houses the differential gear unit, generator and electric motor, and has a second end connected to the drive shaft of the generator.

The generator is axially aligned with the output shaft of the engine, as is the first gear meshes with the second element.

The generator is provided with a brake to regulate the rotation thereof, which brake is preferably a wet multiple disk type brake.

DETAILED DESCRIPTION OF THE PREFERRED EMBODIMENT(S)

The above-mentioned and other objects of the present invention will become more fully understood the following specification, read in light of the drawings which show several preferred embodiments of the present invention. Certain terminology will be used in the following description for convenience in referring to the drawings and should not be considered limiting. For example, the words "up", "down", "right" and "left" will designate directions in the drawings to which reference is made.

The words "in" and "out" will refer to directions toward and away from, respectively, the geometric center of the device and designated parts thereof. Such terminology will include derivatives and words of similar import.

Figure 1:
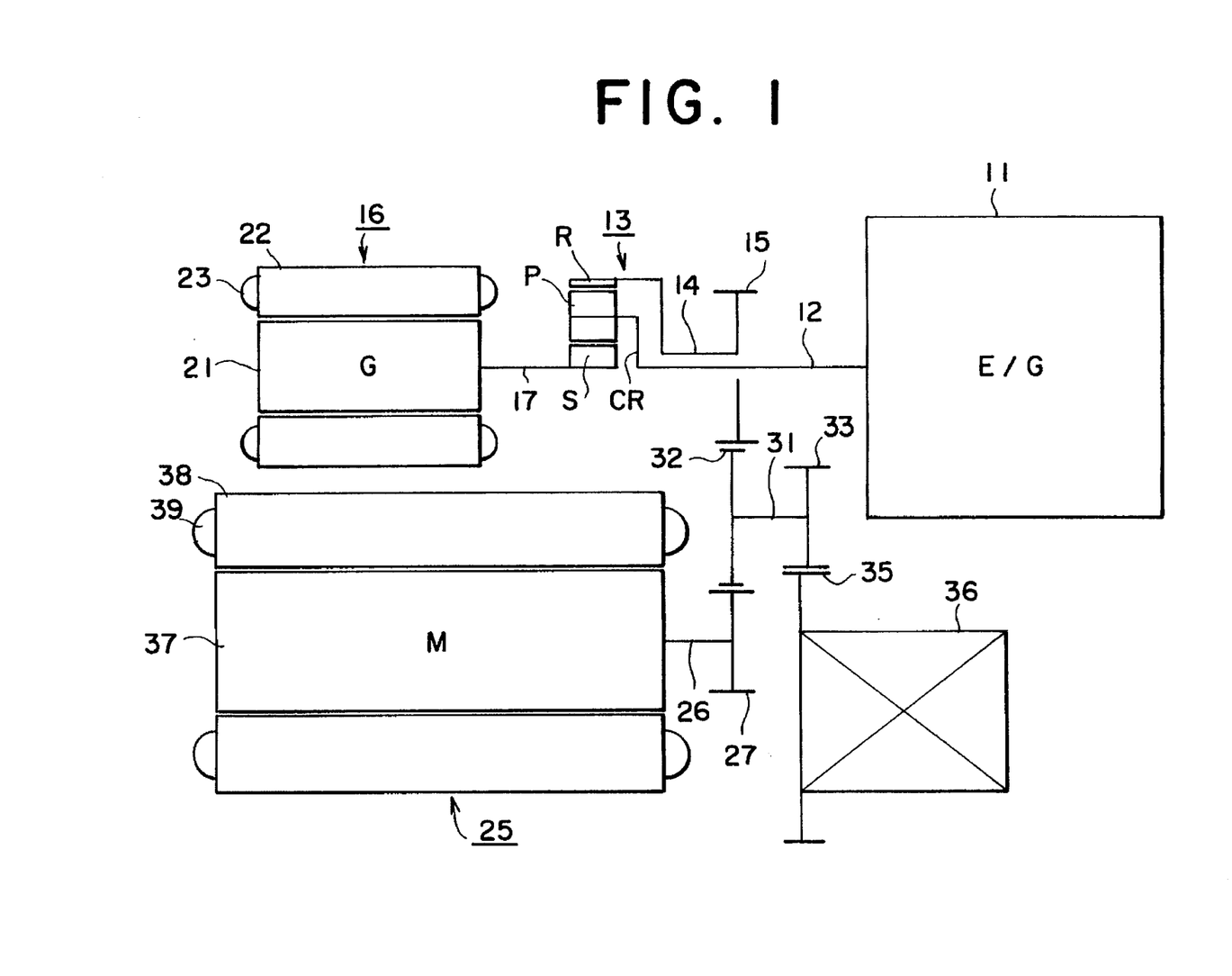
FIG. 1 is a schematic view of a complete drive unit of a hybrid vehicle according to a first embodiment of the present invention.

The main components of the drive unit, as shown in FIG. 1, include an engine (E/G) 11 aligned on a first axis SH1

(also see FIG. 2) an output shaft 12 which is arranged on/the first axis SH1 and which serves to transmit power from the engine 11, a planetary gear unit 13 which is aligned on the first axis SH1 and which serves as a differential gear unit to change speed of rotation received from the output shaft 12, an output shaft 14 which is also aligned on the first axis SH1 and which receives the output from the planetary gear unit 13, a first gear 15 aligned on the first axis SH1 and secured to the output shaft 14, and a generator (G) 16 which is arranged on the first axis SH1 and which is connected with the planetary gear unit 13 through the drive shaft 17. The output shaft 14 is in the form of a sleeve which surrounds the output shaft 12. The first gear 15 is arranged adjacent the planetary gear unit 13 and the engine 11.

The planetary gear unit 13 consists of a sun gear S as a first element, a pinion P meshing with the sun gear S, a ring gear R as a second element meshing with the pinion P, and a carrier CR as a third element carrying the pinion P.

The sun gear S is connected to the generator 16 through the drive shaft 17, the ring gear R is connected to the first gear 15 through the output shaft 14, and the carrier CR is connected to the engine 11 through the output shaft 12.

The generator 16 is secured on the drive shaft 17 and consists of a rotor 21, a stator 22 arranged around the rotor 21, and a coil 23 wound around the stator 22. Accordingly, the generator 16 is adapted to generate electricity using the power received from the drive shaft 17. The coil 23 is connected to a battery (not shown) which stores the generated electricity.

A motor (M) 25 is aligned on a second axis SH2 parallel to the above-mentioned first axis SH1 (also see FIG. 2) receives electricity from the battery, generates rotary power and outputs the generated power through an output shaft 26 aligned on the second axis SH2. A second gear 27 is aligned on the second axis SH2 and secured to the output shaft 26. The motor 25 includes rotor 37, a stator 38 arranged around the rotor 37, and a coil 39 wound around the stator 38. The coil 39 is connected with the battery (not-shown) to receive electricity.

A counter shaft 31 is arranged on a third axis SH3 parallel to the first and second axes SH1, SH2 to rotate the wheels (not-shown) in the same direction as the engine 11. The counter shaft 31 carries, securely connected thereto, a third gear 32. Accordingly, the third gear 32 is meshed with both the first gear 15, which rotates in one direction, and the second gear 27 which rotates in the opposite direction. The counter shaft 31 further carries a fourth gear 33 having a smaller diameter and less teeth than the third gear 32.

Arranged on a fourth axis SH4, which is parallel to the above-mentioned first axis SH1, second axis SH2, and third axis SH3, is a fifth gear 35 meshing with the fourth gear 33. The fifth gear 35 is securely connected to a differential gear unit 36 so that rotation received by the fifth gear 35 is transmitted to and changed into differential motion in the differential gear unit 36 to thereby drive the wheels.

Thus, the third gear 32 is arranged to receive power not only from the engine 11 but also from the motor 25. Accordingly, the hybrid vehicle of the present invention can be driven in three modes, the first being an engine drive mode limited to use of the engine, the second being a motor drive mode limited to use of the motor, and the third being an engine-motor drive mode using both the engine and the motor.

The generator 16 regulates the rotational speed of the drive shaft 17, controlling the electricity generated in order to operate the engine 11 and the motor 2B under the most efficient conditions. The generator 16 may be a starter for the engine 11 on occasion.

As has been described above, the engine 11 and the motor 25 are respectively arranged on different axes, so that the axial length of the drive system can be decreased. In a FF-type hybrid vehicle utilizing such arrangement, the drive system allows room for a sufficient steering angle to minimize the turning radius.

The rotation of the engine 11 is output through the output shaft 12 to the first gear 15 and that of the motor 25 is output through the output shaft 26 to the second gear 27, whereby the gear ratio of the first gear 15 and the third gear 32 and the gear ratio of the second gear 27 and the third gear 32 can be different from each other. This allows for flexibility in design of the drive system, especially the engine 11 and motor 25, to minimize size.

Figure 2:
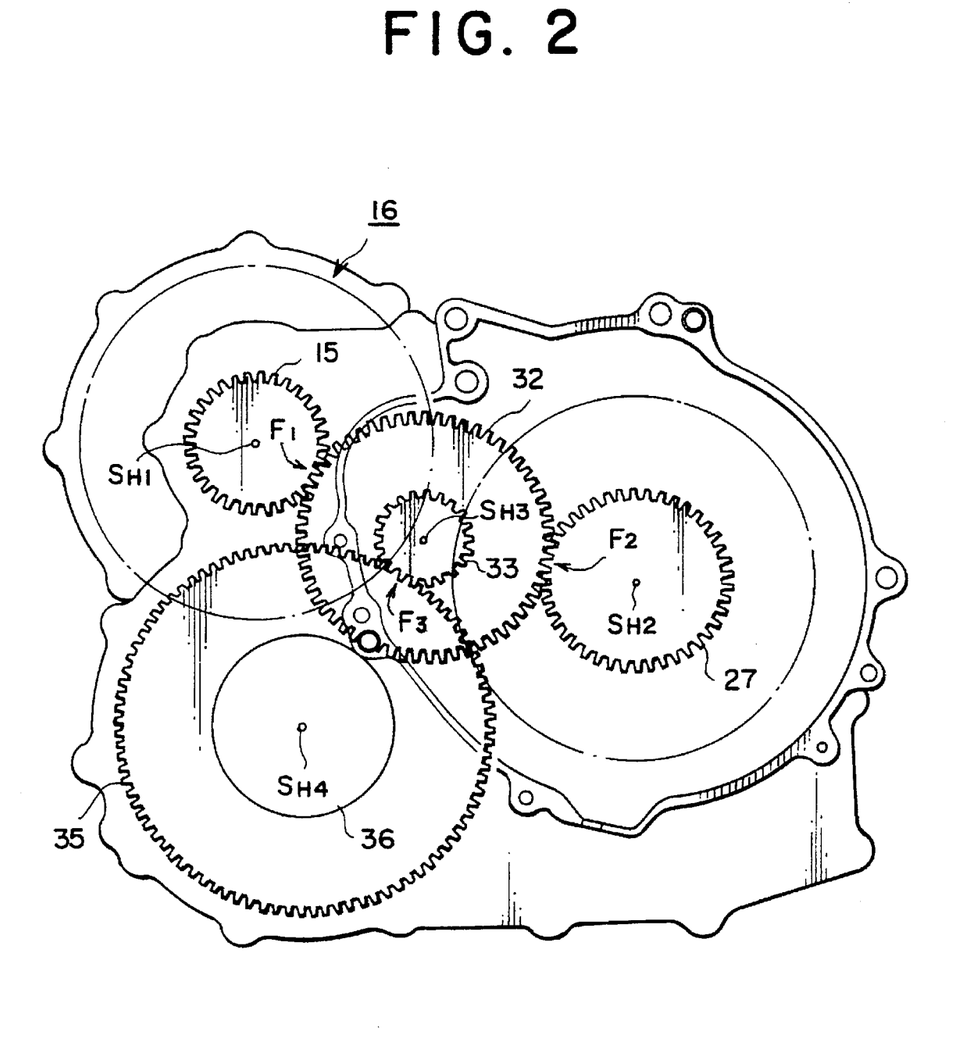
FIG. 2 is a lateral sectional view of the drive unit of the hybrid vehicle according to the first embodiment of FIG. 1.

Since the third gear 32 on the fourth axis is rotatably driven by both the first gear 15 and the second gear 27 and the rotation of the fourth gear 33 is transmitted to the fifth gear 35, as can be seen from FIG. 2, a radial force F1 is imparted from the first gear 15 to the third gear 32, a radial force F2 is imparted from the second gear 27 to the third gear 32 and a radial reaction force F3 is imparted from the fifth gear 35 to the fourth gear 33. However, because the third axis SH3 is located within a triangle defined by the first axis SH1, second axis SH2 and fourth axis SH4, when viewed on end, the radial forces F1, F2 and F3 are counterbalanced as a whole, which counterbalancing reduces the stress on bearings supporting the counter shaft 31.

The details of the hybrid vehicle of the first embodiment will now be described with reference to FIGS. 3 and 4.

Figure 3:
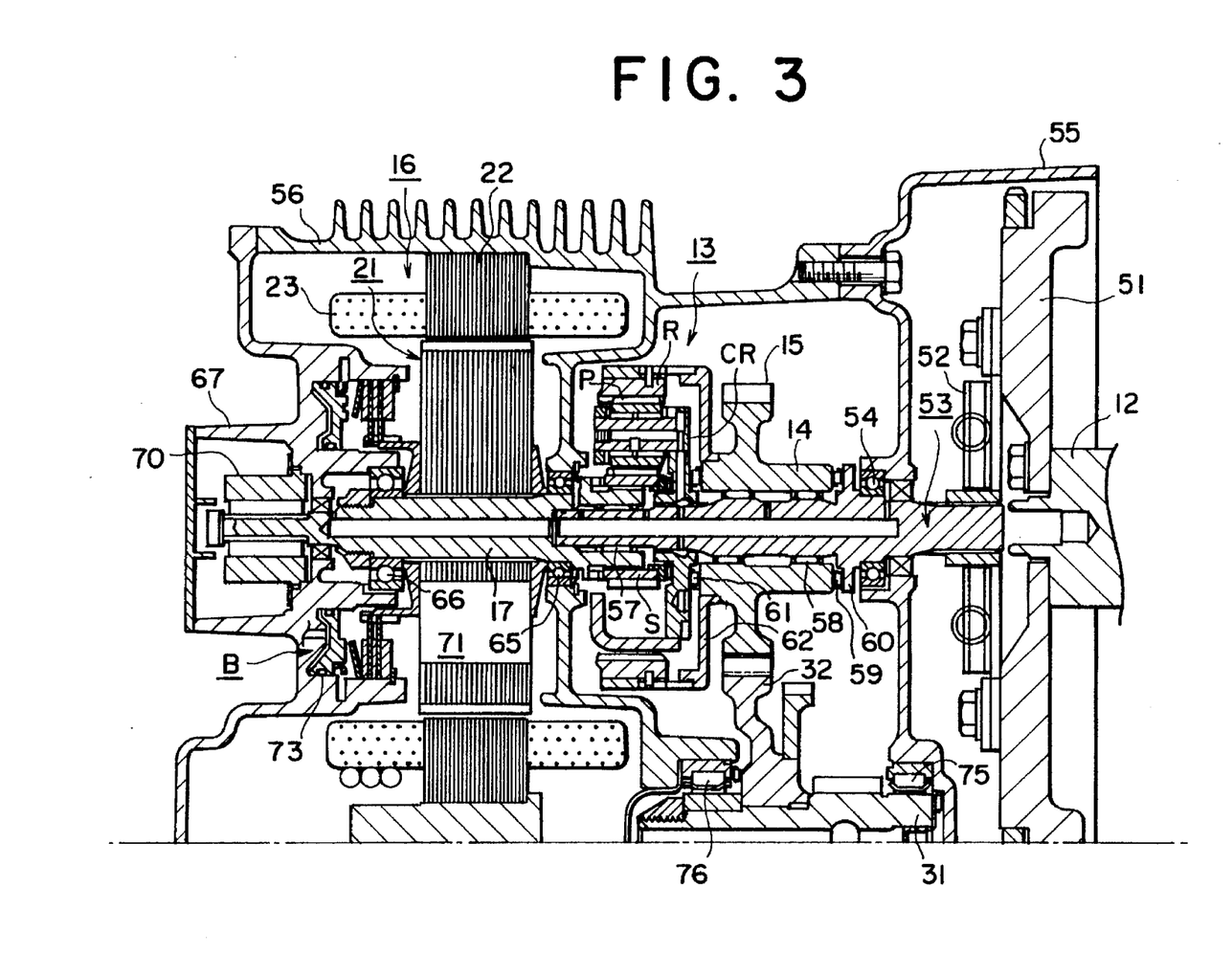
FIG. 3 is a first axial sectional view of the drive unit of the hybrid vehicle according to the first embodiment of FIG. 1.
Figure 4:
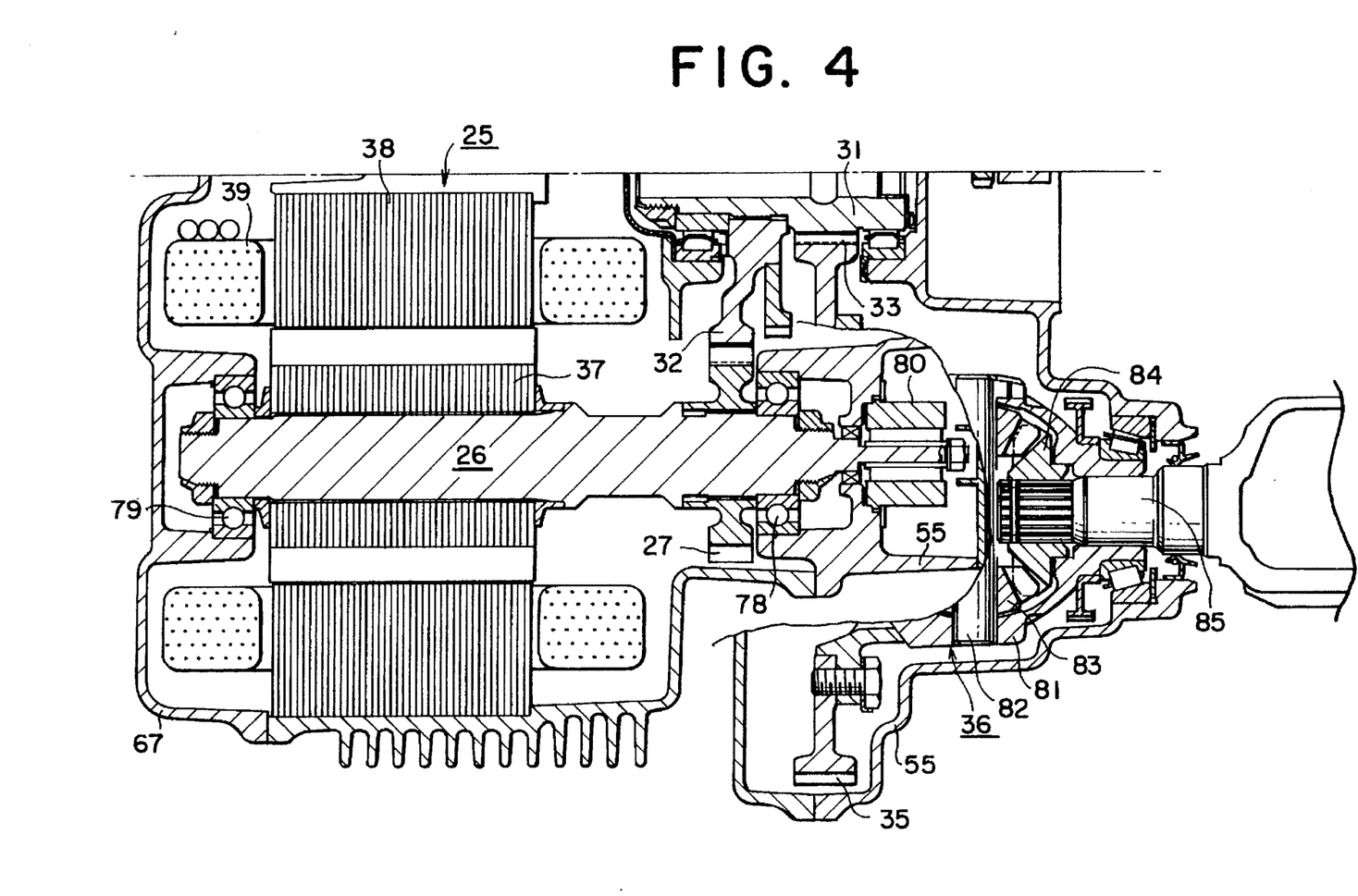
FIG. 4 is a second axial sectional view of the drive unit of the hybrid vehicle according to the first embodiment of FIG. 1.

As seen in FIG. 3, the engine output shaft 12 is coupled to a flywheel 51. The rotational power of the flywheel 51 is input to the planetary gear unit 13 which includes a sun gear S, a pinion P meshing with the sun gear S, a ring gear R meshing with the pinion P, and a carrier CR rotatably supporting the pinion.

The carrier CR is securely connected to the drive shaft 53 and rotates the pinion P. One end (hereinafter the "Forward end") of the drive shaft 53 near the engine 11 is rotatably supported by the casing 55 through bearing 54 and the other end (hereinafter the "Rearward end") of the shaft 53, remote from the engine 11, is supported by the drive shaft 17 through the bearing 57.

The hollow output shaft 14 is fitted over and supported by the drive shaft 53 through the bearing 58. The output shaft 14 is formed as a sleeve and its forward end abuts to a flange 60 formed on the drive shaft 53 via a thrust bearing 59 and its rearward end abuts the carrier CR via a thrust bearing 61.

The rearward end of the output shaft 14 carries a ring gear flange 62 which is securely connected to the ring gear R. Incidentally, the first gear 15 is integrally formed on output shaft 14.

The drive shaft 17 has an opening at its forward end which receives the rearward end of the drive shaft 53 rotatably supported therein by bearing 57. Furthermore, the drive shaft 17 is supported by the casing 56 at its forward end through the bearing 65. The drive shaft 17 extends forward beyond the bearing 65, to where it is splined to the sun gear S. The rearward end of the drive shaft 17 is rotatably supported by the casing 67 through bearing 66. The drive shaft 17 also extends rearward beyond the bearing 66 to where it couples with a resolver 70. The resolver 70 is connected with the drive shaft 17 without any gearing to avoid the problem of backlash and to ensure positional accuracy. The resolver 70 itself is isolated from the engine by the generator 16 on the drive shaft 17, so that it can be easily detached for maintenance.

The generator 16 is centrally located on and securely coupled to the drive shaft 17. The generator 16 is composed of a rotor 21, a stator 22 provided around the rotor 21 and mounted on the casing 56, and a coil wound around the stator 22. The generator 16 is a magneto-generator in which the rotor 21 is a permanent magnet 71 with alternating N- and S-poles. The generation of electricity by the generator 16 is by conversion of rotational energy received from the drive shaft 17. The coil 23 is electrically connected through a conventional power control system to a battery for storing the generated electricity.

The sun gear S of the planetary gear unit 13 is connected to the generator 16 and the carrier CR is connected to the engine 11. Accordingly, if the number of teeth on the ring gear R is twice the number on the sun gear, the torque of the generator 16 can be controlled at ⅓ that of the engine 11 to thereby minimize the size of the generator 16.

When generation of electricity is not required of the generator 16, rotation of the rotor 21 will naturally decrease the rotational speed of the first gear 15. It is therefore preferred to additionally provide a wet multiple disk type brake B, assisted by a hydraulic servo 73, between the rotor 21 and the casing 67. The activation of the brake B is by feed of oil pressure to the hydraulic servo 73 and release is by draining the oil pressure.

The counter shaft 31 is rotatably supported at its forward and rearward ends by the casing 56 through the bearings 75 and 76, respectively. The counter shaft 31 carries the third gear 32 at its rearward end which, in turn, is meshed with the first gear 15.

The motor 25 includes an output shaft 26, rotor 37, stator 38 arranged around the rotor 37 and coil 39 wound around the stator 38. The forward end of the output shaft 26 is supported by the bearing 78 for rotation relative to the casing 55 and its rearward end is supported by the bearing 79 for rotation relative to the casing 67.

The above-mentioned motor 25 produces rotational power from electricity received by the coil 39 which is electrically connected to the power control system including a battery. The output shaft 26 extends through a supporting bearing 78 to a resolver 80 located near the engine 11.

The forward end of the output shaft 26 carries the second gear 27 which is meshed with the third gear 32. Accordingly, the rotation generated by the motor 25 is transmitted to the counter shaft 31 through the output shaft 26, the second gear 27 and the third gear 32.

As can be seen from the drawings, the forward end of the counter shaft 31 is integral with the fourth gear 33 to which the differential gear unit 36 is connected. The differential gear unit 36 consists of a differential case 81 having the fifth gear 35 on its outer periphery, a pinion shaft 82 mounted on the differential case 81, a pinion 83 rotatably supported on the pinion shaft 82 and right and left side gears 84 (only the left side gear is shown in the drawing) meshing with the pinion 83 so that the rotation received by the fifth gear 35 is differentially transmitted to the side gears 84. Since the side gear 84 is securely mounted on the drive shaft 85, the differentially transmitted rotation is finally transmitted through drive shaft 85 to a wheel (not shown).

A second embodiment of the present invention will be described with reference to FIG. 5. Since the motor 25, the differential gear system 36 and the related components have the same or similar structure as those of the first embodiment, their description is omitted here and FIG. 4 should be referred to for their explanation.

Figure 5:
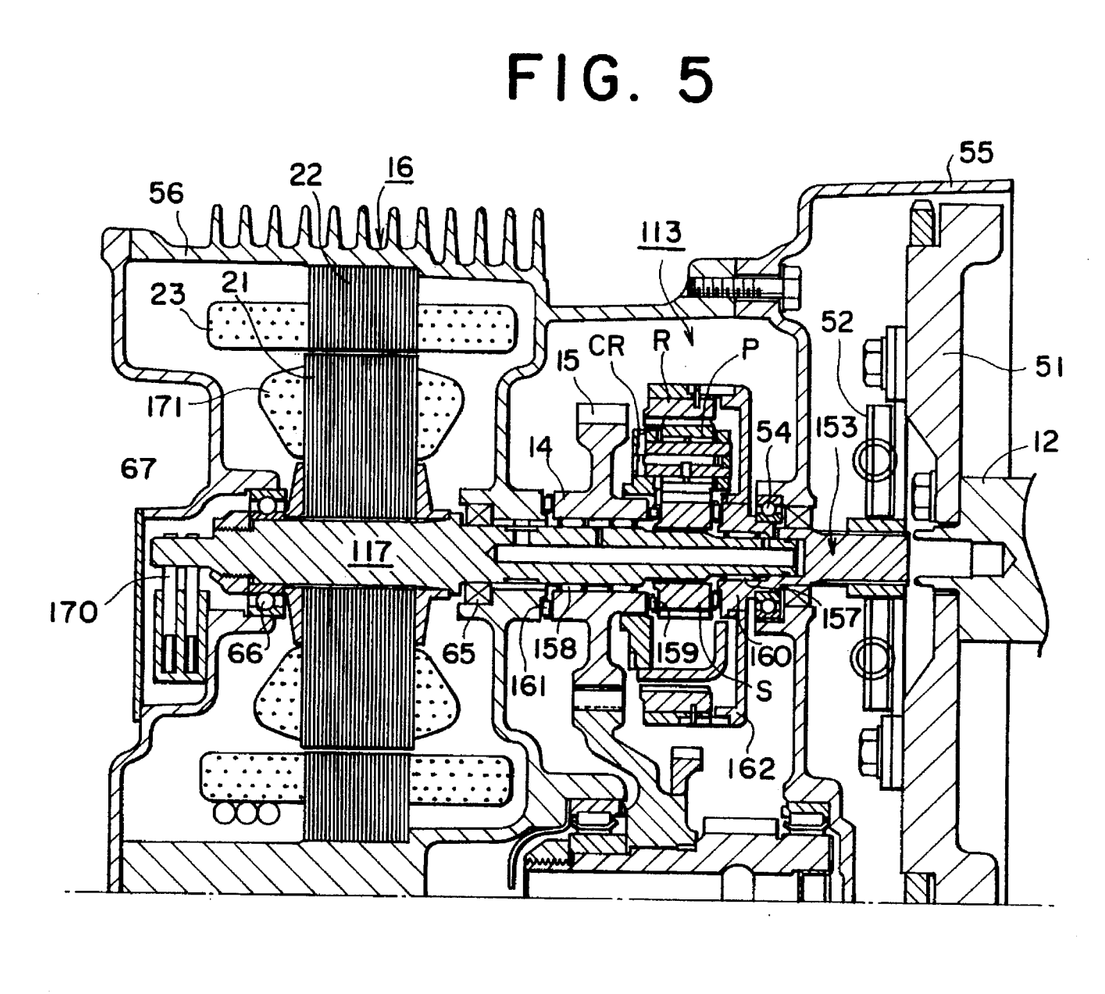
FIG. 5 is a fragmentary axial view of the drive unit of a hybrid vehicle according to a second embodiment of the present invention.

As shown in FIG. 5, an output shaft 12 outputs rotational power from the engine 11 to a flywheel 51. The rotational power received by flywheel 51 is input to a planetary gear unit 113 through a damper device 52 and a drive shaft 153. The planetary gear unit 113 consists of a sun gear S as the first element, a pinion P meshing with the sun gear S, a ring gear R as the third element meshing with the pinion P, and a carrier CR as the second element supporting the pinion P.

A flange portion 160 is formed at the rearward end of the drive shaft 153 and fixed thereto is a ring gear flange 162 on which the ring gear R is mounted. The rearward end of the drive shaft 153 is rotatably supported by the casing 55 through a bearing 54 and has a central recess which receives the drive shaft 117 rotatably supported therein by bearing 157.

The drive shaft 117 is centrally and rotatably supported by the case 56 through the bearing 65. The drive shaft 117 is splined to the sun gear S rearward of and adjacent to the bearing 157. The rearward end portion of the drive shaft 117 is rotatably supported by the casing 67 through bearing 66. The end of the drive shaft 117 extending rearward of the bearing 66 carries a brush 170. The brush 170 is disposed on the drive shaft 117 on the opposite side of the engine 11 with the generator 16 in between to facilitate maintenance of the brush 170.

The outer periphery of the drive shaft 117 rotatably supports output shaft 14 via a bearing 158. The output shaft 14 is formed as a sleeve with its forward end abutting the sun gear S via a thrust bearing 159 and its rearward end abutting the casing 56 via a thrust bearing 161. The first gear 15 is integrally formed on the output shaft 14.

As seen in FIG. 5, the generator 16 is located at the rearward end of drive shaft 117. The generator 16 is securely connected to the drive shaft 117 and includes rotor 21, stator 22 arranged around the rotor 21 and mounted on the casing 56, coil 171 wound around the rotor 21 and coil 23 wound around the stator 22. The generator 16 is a magneto-generator with its coil 171 electrically connected to receive excitation power through the brush. The generator 16 generates electricity from the rotational energy received from the drive shaft 117. The coil 23 is electrically connected to a battery for supplying and storing electricity in the battery.

Since the sun gear S of the planetary gear unit 113 is connected to the generator 16 and the ring gear R is connected to the engine 11, if the number of teeth on the ring gear R is twice the number on the sun gear, the torque of the generator 16 will be ½ that of the engine 11, thus minimizing the size of the generator 16.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A hybrid vehicle powertrain, comprising:
   an internal combustion engine for driving an engine output shaft and thereby generating mechanical energy;
   a generator for converting said mechanical energy into electricity;
   an electric motor driven by said electricity to output rotational power at a motor output shaft;
   a differential gear unit including at least three elements, the first connecting to said generator, the second connecting to a first gear and the third connecting to said internal combustion engine;

a second gear connected to said motor output shaft; and a counter shaft connected to an output differential gear unit and having mounted thereon a third gear meshing with the first and second gears; and wherein said internal combustion engine, differential gear unit and generator are aligned on a first axis, said electric motor is aligned on a second axis parallel to the first axis, said counter shaft is aligned on a third axis parallel to the first and second axes, said output differential gear unit is aligned on a fourth axis parallel to the first, second and third axes, and the third axis is disposed inside of a triangle defined by the first, second and fourth axes viewed on end.

2. A hybrid vehicle powertrain according to claim 1, wherein said counter shaft carries a fourth gear for driving said differential gear unit.

3. A hybrid vehicle according to claim 2, wherein said differential gear unit includes a fifth gear meshing with said fourth gear.

4. A hybrid vehicle powertrain according to claim 1, wherein said first, second and third elements of said differential gear unit are, respectively, a sun gear, a ring gear and a carrier forming a planetary gear unit.

5. A hybrid vehicle powertrain according to claim 1, wherein said first, second and third elements of said differential gear unit are, respectively, a sun gear, a carrier and a ring gear forming a planetary gear unit.

6. A hybrid vehicle powertrain according to claim 1, wherein said generator is a magneto generator.

7. A hybrid vehicle powertrain according to claim 1, wherein said generator is an excitation generator.

8. A hybrid vehicle powertrain according to claim 1, further comprising a resolver aligned on said first axis on the opposite side of the generator from said internal combustion engine.

9. A hybrid vehicle powertrain according to claim 1, wherein the first and third gears have a gear ratio different from that of the second and third gears.

10. A hybrid vehicle powertrain according to claim 1, wherein said engine output shaft has one end rotatably supported by a case housing said differential gear unit, said generator and said electric motor and a second end connected to said generator through said differential gear unit.

11. A hybrid vehicle powertrain according to claim 1, wherein said generator is axially aligned with said engine output shaft.

12. A hybrid vehicle powertrain according to claim 1, wherein the first gear connected to the second element is axially aligned with said engine output shaft.

13. A hybrid vehicle powertrain according to claim 1, wherein said generator is provided with a brake to regulate the rotation thereof.

14. A hybrid vehicle powertrain according to claim 10, wherein said brake is a wet multiple disk brake.

* * * * *

UNITED STATES PATENT AND TRADEMARK OFFICE
CERTIFICATE OF CORRECTION

PATENT NO. : 5,643,119
DATED : July 1, 1997
INVENTOR(S) : YAMAGUCHI et al

It is certified that error appears in the above-indentified patent and that said Letters Patent is hereby corrected as shown below:

Col. 2, line 29, after "gear" insert --which--; and line 54, after "understood" insert --from--.

Col. 7, line 18, after "said" insert --output--; and line 19, after "vehicle" insert --powertrain--.

Signed and Sealed this

Seventeenth Day of March, 1998

Attest:

BRUCE LEHMAN

Attesting Officer      Commissioner of Patents and Trademarks